United States Patent [19]

Brown

[11] Patent Number: 5,625,515

[45] Date of Patent: *Apr. 29, 1997

[54] COMPACT, HIGH-SPEED, ROTARY ACTUATOR AND TRANSDUCER ASSEMBLY WITH REDUCED MOMENT OF INERTIA AND MASS-BALANCED STRUCTURAL OVERLAP WITH DRIVE MOTOR, AND ORGANIZING METHOD FOR THE SAME

[75] Inventor: Stanley F. Brown, Saratoga, Calif.

[73] Assignee: Censtor Corp., San Jose, Calif.

[ * ] Notice: The term of this patent shall not extend beyond the expiration date of Pat. No. 5,396,388.

[21] Appl. No.: 389,964

[22] Filed: Jan. 20, 1995

Related U.S. Application Data

[63] Continuation-in-part of Ser. No. 843,895, Feb. 27, 1992, Pat. No. 5,396,388.

[51] Int. Cl.$^6$ .............................. G11B 5/55; G11B 21/08
[52] U.S. Cl. ................................................ 360/106
[58] Field of Search .................. 360/97.01, 98.01, 360/98.07, 104–106, 108

[56] References Cited

U.S. PATENT DOCUMENTS

| | | | |
|---|---|---|---|
| 4,476,404 | 10/1984 | Bygdnes | 310/27 |
| 4,490,635 | 12/1984 | Harrison et al. | 310/38 |
| 4,916,342 | 4/1990 | Hirano et al. | 310/51 |
| 4,923,406 | 5/1990 | Bucknam | 439/77 |
| 5,016,131 | 5/1991 | Riggle et al. | 360/106 |
| 5,018,035 | 5/1991 | Johnson | 360/106 |
| 5,025,335 | 6/1991 | Stefansky | 360/97.01 |
| 5,025,336 | 6/1991 | Morehouse et al. | 360/97.02 |
| 5,027,242 | 6/1991 | Nishida et al. | 360/106 |
| 5,041,932 | 8/1991 | Hamilton | 360/932 |
| 5,041,934 | 8/1991 | Stefansky | 360/106 |
| 5,060,100 | 10/1991 | Mihara et al. | 360/106 |
| 5,064,377 | 11/1991 | Wood | 439/67 |
| 5,073,242 | 12/1991 | Hamilton | 204/192.22 |
| 5,111,351 | 5/1992 | Hamilton | 360/104 |
| 5,163,218 | 11/1992 | Hamilton | 29/603 |
| 5,172,282 | 12/1992 | Ghose | 360/78.12 |
| 5,218,496 | 6/1993 | Kaczeus | 360/106 |
| 5,247,410 | 9/1993 | Ebihara et al. | 360/106 |
| 5,315,467 | 5/1994 | Yoshida | 360/106 |

*Primary Examiner*—Jefferson Evans
*Attorney, Agent, or Firm*—Kolisch, Hartwell, Dickinson, McCormack & Heuser

[57] ABSTRACT

Compact, high-speed, low-mass, rotary actuator structure (and a related method) for manipulating the position of a read/write transducer in a disk-drive system. The actuator includes a motor with a winding distributed in such a fashion that circumscribes, or alternatively semi-circumbounds, the rotary axis of the actuator, thus to assist in providing appropriate mass balance. Electrical connections to this winding, and to other components carried for motion by the actuator structure, extend in a low-torque fashion on and substantially coincidentally along the rotary axis of the actuator.

3 Claims, 5 Drawing Sheets

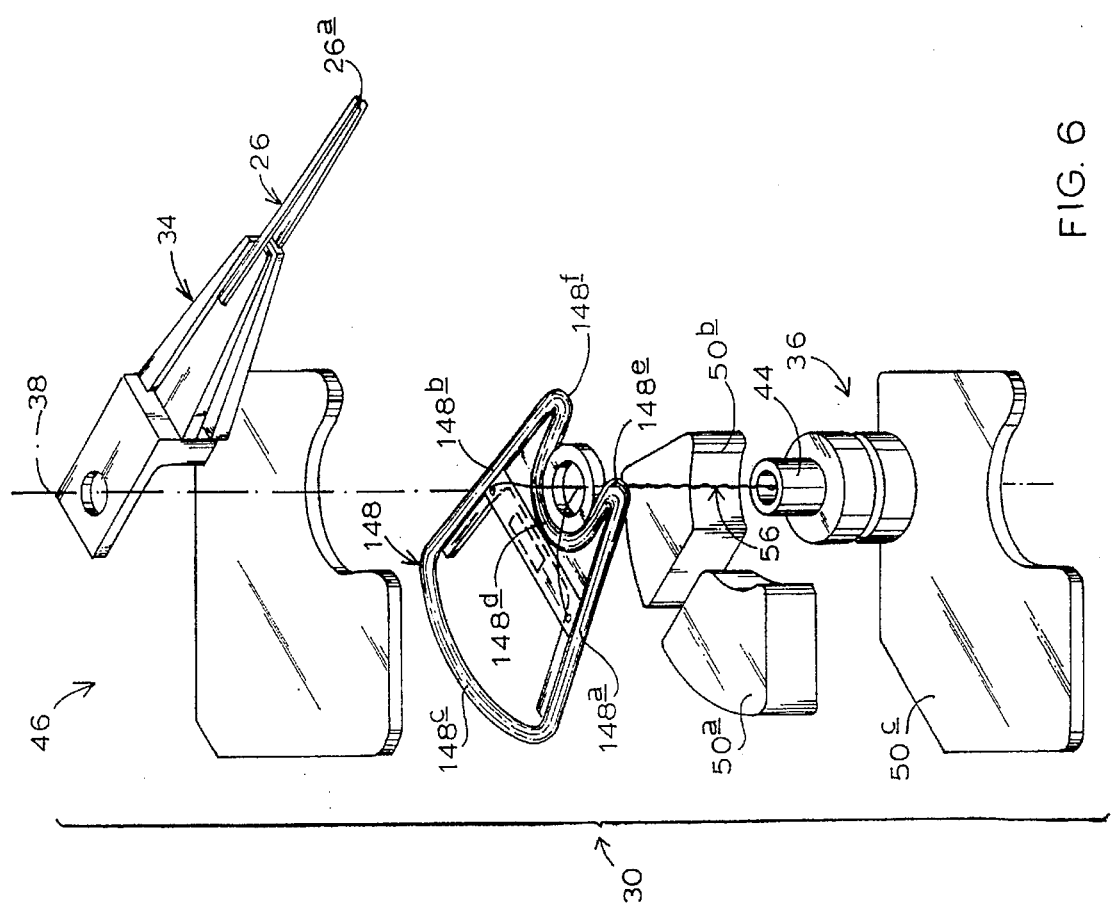

COMPACT, HIGH-SPEED, ROTARY ACTUATOR AND TRANSDUCER ASSEMBLY WITH REDUCED MOMENT OF INERTIA AND MASS-BALANCED STRUCTURAL OVERLAP WITH DRIVE MOTOR, AND ORGANIZING METHOD FOR THE SAME

CROSS-REFERENCE TO RELATED APPLICATIONS

This application is a continuation-in-part of Ser. No. 07/843,895 filed Feb. 27, 1992, now U.S. Pat. No. 5,396,388.

FIELD OF THE INVENTION

This invention relates generally to actuators for rigid-disk drives, and more particularly to a compact, high-speed, low-mass, rotary actuator (and related structure in an assembly including a read/write transducer) which is especially suited for use in small-form-factor disk-drive systems employing low-mass heads/suspensions. As will become apparent, the invention is also entirely suitable for use in other than small-form-factor systems. The invention also relates to a method for organizing such a structural assembly. In this context, the invention proposes an organization employing such an actuator which is specially mass-balanced via structure that has a shared/overlapped functional relationship with a rotary drive motor (typically referred to as a voice-coil motor) that forms part of the overall actuator structure. Specially organized, non-traditional, non-flex-circuit conductors extend to elements in the assembly (from the "outside world" so-to-speak) generally coincidentally on and along the rotary axis provided for the assembly so as to minimize the torque generated by the mechanical properties of these conductors.

BACKGROUND OF THE INVENTION

The advent of the digital computer created a demand for direct-access storage devices capable of storing and retrieving large volumes of data. Main memory (historically referred to as "core memory" but now typically taking the form of "semiconductor memory") and other fast electronic storage systems were not feasible for mass-storage applications principally because of their costs. Paper, tape and floppy disk memories proved unsatisfactory and ineffective due to their slow access times. Accordingly, digital storage devices using rotating, rigid, magnetic media ("disk drives") were developed as an effective compromise between reasonable information access times, and cost-effective storage capabilities. These disk drives also provided greater storage capacities for a given enclosure volume than did most competing storage devices.

Disk drives typically contain one or more rotating disks which have thin magnetic layers on their planar surfaces. Information normally is stored on and retrieved from the magnetic layers by means of a "flying head", which takes the form of an electromagnetic transducer element and an air-bearing slider. The slider positions the associated transducer on a pressurized air film at a relatively close and constant distance above the rotating disk surface. The pressurized air film is developed by loading a precisely shaped slider against a moving disk surface. A region of the air film moving with the disk is compressed by the slider, thus creating an air pressure that tends to force the slider away from the disk's surface. By carefully controlling the shape and dimensions of the slider and load force acting on the slider, the air being compressed between the slider and the disk creates an upward pressure on the slider which maintains it in equilibrium at a reasonably stable distance away from the disk's surface. Although this technique has traditionally been referred to as "flying head" technology, the term "flying" is a misnomer, inasmuch as the head does not actually fly, but rather is supported by a hydrodynamically lubricated air bearing.

Heads typically are mounted on support arms that are attached to a high-speed actuator. An actuator, essentially, is a support structure for the heads, with the actuator also including a motor (typically referred to, as indicated earlier, as a voice-coil motor) assembly that allows the arm in the actuator to move and to position the heads accurately with respect to certain predetermined positions relative to a disk's surface(s). The most common actuators are either linear or rotary designs. Linear actuators move and position the associated heads on a radial path with respect to the disk's center, whereas rotary actuators, which consist of a pivoted support beam and motor mechanism, move and position the heads in an arced path typically approximating a radial path with respect to the disk center. By positioning the heads selectively at different radii with respect to the axis of rotation of the disk, information can be recorded in discrete, concentric tracks. Since the heads move in unison across the disk's surfaces, all of the heads controlled by a common actuator are maintained in a "cylinder" of tracks. This arrangement permits any track in the "current cylinder" to be accessed within microseconds.

For low-performance disk drives, actuator positioning is performed "open loop", meaning that the actuator's position is determined by a device, such as a stepper motor, with no positional feedback provided from the disk. Open-loop methods limit areal density because they can only be used at relatively low track densities (which are measured in tracks per inch or "TPI"). In contrast, current high-performance disk drives utilize "closed-loop" servo-positioning techniques to read and follow servo-information which is stored on disks. This approach offers significantly greater accuracy in positioning the actuator relative to the information recorded on a disk. Traditionally, in drives with three or more disks, the actuator's position is established with respect to a dedicated disk surface on which servo information is recorded, and all of the heads associated with the actuator stack are positioned in a cylinder relative to the position of the servo head on that dedicated surface. Alternatively, on drives with one or two disks, or on very high-performance drives, servo information is embedded within the data tracks, and head positioning is performed relative to the specific track of information being written or read.

Many computer operating systems today depend upon the availability of reasonably priced, high-performance, mass-storage devices in order to implement practical solutions to such fundamental problems as the limited capacity of relatively expensive main memory. By swapping, or paging, portions of main memory selectively to and from a high-performance disk drive, the drive can be used, in effect, as an extension of main memory. This, in turn, permits a computer to operate on programs and data that greatly exceed the size limitations of actual main memory. Graphical user-interface and multi-media applications create even greater demands for improved disk-drive performance and capacity, and in this kind of a setting, the actuator proposed by the present invention offers important, contributive, enhancement applicability.

In modern computer systems applications, among the most important disk-drive performance parameters are (1)

formatted box storage capacity per unit of volume (a measure of volumetric efficiency), (2) data transfer rate, and (3) average actuator access time—each of which parameters is significantly affected by actuator performance.

The average actuator access time is defined in terms of the sum of the average seek time plus the so-called settling time. This access time can be reduced by improving servo-system performance, by improving the performance of the actuator drive motor, by reducing bearing friction, by reducing the moment of inertia of the actuator/drive-motor/head/flexure assembly, etc., and since the average access times of even the most advanced, rigid-disk drive systems are measured in milliseconds, as opposed to the nanoseconds used to measure CPU and semi-conductor memory cycle times, disk-drive accesses are a significant bottleneck in overall computer-system performance.

Similarly, actuator access time operates as an appreciable limit on the achievable, sustained data transfer rate. Although common measures of data transfer rate are typically determined without reference to actuator performance (i.e., peak data rate as determined by the number of bytes in a data track times the angular speed of the disk), non-trivial transfers of data typically require that the head(s) be moved during the course of the data transfer, whenever more than a single track of data is requested. Accordingly, actuator performance has a significant impact on the maximum sustainable data rate.

Volumetric efficiency is also affected by actuator design. In particular, smaller, more compact actuators require less space-"overhead" within a disk-drive housing. Space constraints have become particularly problematic in portable, rigid-disk drive applications, where disk diameters are now only about 2-inches, and where the permissible overall drive height is only about ½-inch. Because rotary actuators are generally more compact than linear actuators, are usually less complicated in design, and are more easily mass balanced, rotary actuators tend to predominate in this small drive regime. Nonetheless, it remains a significant challenge to design a high-performance rotary actuator within the confines, say, of a 48-millimeter-form-factor disk drive.

In addition to the space limitations just mentioned above, advanced actuators for use in small-form-factor drives are also required to maintain relatively high levels of performance, notwithstanding reductions in available power, and also notwithstanding reduced voice-coil motor dimensions—thus placing a significant premium on actuator efficiency.

The trend toward small disk-drive designs has also been accompanied by a corresponding trend toward smaller, extremely low-mass heads which are designed to operate very near to, or in extremely-low-load-contact with, the associated disk surface. Such reduced head mass necessitates a corresponding reduction in the mass of the voice-coil assembly (situated on the opposite end of the actuator) in order to maintain an appropriate dynamic balance about the actuator's axis of rotation, which balance is required to minimize the effects of radial forces that will otherwise tend to urge the head(s) off track. For extremely low-mass head/suspension systems used in conjunction with prior art actuators in drives having few heads per actuator, however, the mass of the voice-coil side of the actuator structure (relative to the actuator's axis of rotation) is likely to exceed the mass of the transducer-carrying portion of the actuator. Therefore, in order to maintain dynamic mass balance in such an actuator assembly, additional mass must typically be added to the transducer side of the actuator. Unfortunately, such additional mass increases the moment of inertia of the actuator, and consequently decreases its resonant frequency—resulting in adverse effects on seek time and servo-system performance.

Yet another consideration with regard to the issue of low-mass actuator assemblies is that there are components on these assemblies, for example, a drive-motor winding, and the energizing/pick-up coils associated with transducers, to which conductive connections must be made with external circuitry. Accordingly, conductors must extend between such components and the "outside world", and these conductors must accommodate the relative motion which occurs between such an assembly and the associated main frame structure during normal operation. A consequence, of course, is that, typically (considering prior art approaches), the extending, connective conductors offer resistance to motion which can cause a number of very undesirable effects, such as, for example, biasing an actuator undesirably toward one of its limits of travel, and adding a force that must be overcome during actuator operation which can slow down actuator positioning performance, and/or require a larger drive motor and/or the application of more drive-motor power. For example, a typical, traditional approach is to use flex-circuit conductors which extend in a reverse bend toward connections on an actuator's moving structure, the manipulation of which bend requires continuous, "offsetting" servo power.

The various problems presented by such "outside world" conductive connections have been addressed in different ways in prior-art approaches toward providing solutions, and, as an example, this very issue is discussed in U.S. Pat. Nos. 4,476,404 to Bygdnes, 5,025,335 to Stephansky, and 5,025,336 to Moorehouse et al. These three patents disclose different approaches toward a currently favored way of reducing the problems just mentioned—namely, the use of so-called ribbon-like flex circuits that extend between an actuator assembly and the obligatory outside-world circuitry. Nonetheless, these kinds of solutions, as illustrated in these three patents, require some significant moving of connecting conductors, and attendant overcoming of resistance forces, and do indeed leave room for thoughtful improvement.

Accordingly, the present invention described, illustrated and claimed herein provides a compact, high-performance rotary actuator (and related structure in an assembly including a read/write transducer) which significantly overcomes the problems inherent in the prior art, and which specifically addresses the important actuator-system structural and performance considerations discussed above. In addition, it involves a structural organizational method which assures successful addressing of such problems and considerations.

In the context of illustrating and describing the present invention, one should recognize that significant recent advances over prior art disk-drive technology have occurred, and several important ones of these, which are related in different ways to the features and advantages of the present invention, have been disclosed in the following U.S. patents and co-pending U.S. patent applications:

1. U.S. Pat. No. 5,041,932 for INTEGRATED MAGNETIC READ/WRITE HEAD/FLEXURE/CONDUCTOR STRUCTURE, issued Aug. 20, 1991;
2. U.S. Pat. No. 5,073,242 for METHOD OF MAKING INTEGRATED MAGNETIC READ/WRITE HEAD/FLEXURE/CONDUCTOR STRUCTURE, issued Dec. 17, 1991;
3. U.S. Pat. No. 5,111,351 for INTEGRATED MAGNETIC READ/WRITE HEAD/FLEXURE/CONDUCTOR STRUCTURE, issued May 5, 1992;

4. U.S. Pat. No. 5,163,218 for INTEGRATED MAGNETIC READ/WRITE HEAD/FLEXURE/CONDUCTOR STRUCTURE, issued Nov. 17, 1992;

5. U.S. patent application Ser. No. 08/179,758 for WEAR-RESISTANT HEAD FOR CONTACT READING AND WRITING MAGNETIC MEDIA, filed Jan. 7, 1994 which is a file-wrapper-continuation application of Ser. No. 07/684,025, filed Apr. 10, 1991;

6. U.S. patent application Ser. No. 07/746,916 for UNITARY MICRO-FLEXURE STRUCTURE AND METHOD OF MAKING SAME, filed Aug. 19, 1991;

7. U.S. patent application Ser. No. 07/992,886 for UNITARY MICRO-FLEXURE STRUCTURE AND METHOD OF MAKING SAME, filed Dec. 14, 1992, now U.S. Pat. No. 5,453,315; which is a continuation-in-part of Ser. No. 07/746,916, filed Aug. 19, 1991;

8. U.S. patent application Ser. No. 07/990,410 for UNITARY MICRO-FLEXURE STRUCTURE AND METHOD OF MAKING SAME, filed Dec. 10, 1992 which is a divisional continuation of Ser. No. 07/746,916, filed Aug. 19, 1991;

9. U.S. patent application Ser. No. 08/195,914 for UNITARY MICRO-FLEXURE STRUCTURE AND METHOD OF MAKING SAME, filed Feb. 10, 1994 which is a continuation of Ser. No. 07/990,410, filed Dec. 10, 1992 which is a divisional continuation of Ser. No. 07/746,916, filed Aug. 19, 1991;

10. U.S. patent application Ser. No. 07/990,005 for UNITARY MICRO-FLEXURE STRUCTURE AND METHOD OF MAKING SAME, filed Dec. 10, 1992 which is a divisional continuation of Ser. No. 07/746,916, filed Aug. 19, 1991;

11. U.S. patent application Ser. No. 07/989,170 for UNITARY MICRO-FLEXURE STRUCTURE AND METHOD OF MAKING SAME, filed Dec. 10, 1992, now U.S. Pat. No. 5,476,131; which is a divisional continuation of Ser. No. 07/746,916, filed Aug. 19, 1991;

12. U.S. patent application Ser. No. 08/180,540 for HIGH-CAPACITY, MICRO-SIZE, RIGID-DISK, MAGNETIC DIGITAL-INFORMATION STORAGE SYSTEM, filed Jan. 12, 1994 which is a continuation of Ser. No. 07/760,586, filed Sep. 16, 1991;

13. U.S. patent application Ser. No. 07/783,509 for SIZE-INDEPENDENT, RIGID-DISK, MAGNETIC, DIGITAL-INFORMATION STORAGE SYSTEM WITH LOCALIZED READ/WRITE ENHANCEMENTS filed Oct. 28, 1991; and 14. U.S. patent application Ser. No. 07/783,619 for GIMBALED MICRO-HEAD/FLEXURE/CONDUCTOR ASSEMBLY AND SYSTEM, filed Oct. 28, 1991, now U.S. Pat. No. 5,490,027.

The respective disclosures of these documents are now expressly incorporated by reference into the present disclosure.

SUMMARY OF THE INVENTION

Briefly, the present invention in its preferred embodiment offers and features a low-mass, journaled actuator frame pivotally mounted through a journal bearing effectively supported on a disk-drive base plate. Magnet structure effectively positioned in the associated disk-drive system which forms part of the main frame in the disk-drive system cooperates with a flat coil structure that is formed by winding numerous turns of conductor wire in a rounded-corner, non-apexed pie-, or wedge-, shaped configuration around a portion of the actuator frame, thus to form a voice-coil motor for rotating the actuator frame selectively about the journal (pivot) axis. The coil circumscribes the journal axis, with its center of mass offset to one side of this axis.

In an alternative embodiment, the flat coil structure is formed by winding numerous turns of conductor wire in a rounded-corner, W-shaped configuration around a portion of the actuator frame. In the W-shaped configuration, the winding has a non-circumscribing disposition, or what may be thought of as a semi-circumbounding disposition relative to the journal axis.

A flexure support unit, onto which one or more head/suspension structure(s) is (are) mounted, is joined as a unit in the present embodiments to the actuator frame, and extends opposite the center of mass of the coil windings relative to the journal axis.

Although the bulk of the coil windings are thus situated on the side of the actuator which is opposite the flexure support unit, that portion of the coil windings which, in the first-mentioned embodiment wraps around the axis of rotation of the journal bearing, and sub-portions in the second-mentioned embodiment which semi-circumbounds the same axis, contributes mass to the opposite (transducer) side of the actuator. These unique configurations permit the attachment of extremely low-mass head/suspension structures to the flexure support unit without requiring the addition of mass on the head/suspension side of the actuator in order to attain an appropriate dynamic balance relative to the journal axis (vis-a-vis the mass of the voice-coil-motor winding).

The actuator frame, or frame component, proposed in accordance with the present invention has a hollow core which symmetrically surrounds the effective journal axis for the frame, and it is generally coincidentally on and along this journal axis, and extending through the hollow core of the actuator frame, that conductors are extended to those components in the assembly (such as the read/write transducer(s) and the winding in the voice-coil-motor) that require connections to circuitry in the "outside world". This unique approach, which is so different from traditional, reverse-bend flex-circuit approaches, results in these extending conductors adding almost no appreciable resistance to rotation, and certainly no tendency to bias the actuator frame and its carried components toward one or the other of its limits of rotary travel. Recognizing that slender, flex-circuit conductors can be employed in the "on axis" structure proposed by the invention, the term "non-flex" as employed herein to distinguish the invention is intended only to set the invention apart from the traditional uses of flex-circuit conductors, as described above.

The actuator structure and assembly of the present invention, and the organizational methodology which lead to the same, offer a large number of significant advantages, and some of these are listed immediately hereinbelow: (1) reduced component count for improved reliability, ease of assembly and low-cost manufacturing; (2) reduced component size and mass, with higher attendant component stiffness which, when coupled with high-bandwidth servo systems, appreciably decreases access times, and allows a drive to tolerate much higher operating shock and vibration without any noticeable degradation of data-handling reliability; (3) reduced moment of inertia about the actuator's axis of rotation resulting from the unique coil configurations, which configurations contribute to a reduction in overall mass for mass-balanced actuator assemblies used in conjunction with low-mass heads/suspensions; (4) improved performance and/or power consumption due to the reduced size, mass and moment of inertia of the moving structures; (5) improved voice-coil motor performance and efficiency due to the near optimal configurations of the coil windings which, for a given actuator size, permit the maximum length of wire to be maintained within the flux gap created by the voice-coil motor magnets. Coupled with this, as an additional advantage, is that the wire within the motor flux gap is configured generally in a radial direction with respect to the pivot axis of the actuator, which configuration maximizes torque at the pivot axis from a given current element in the coil windings within the flux gap. Already mentioned above as yet another advantage offered by the present invention is that conductive connections are proposed to extend to elements carded on the actuator frame coincidentally on and along the rotational axis, thus to minimize, to near insignificance, the resistance to rotary motion, and the undesired offset biasing, which might otherwise be encountered, and which does indeed characterize even the best of the solution approaches offered by the prior art.

These and many other objects, contributions and advantages which are offered by the structure and method of the present invention will become more fully apparent as the description that now follows is read in conjunction with the accompanying drawings.

DESCRIPTION OF THE DRAWINGS

FIG. 6 (which is like FIG. 3) is an enlarged view of components making up the combinational assembly of FIG. 5, exploded and isolated from other structure to illustrate details of configuration and construction.

DETAILED DESCRIPTION OF, AND BEST MODE FOR CARRYING OUT, THE INVENTION

Figure 1:
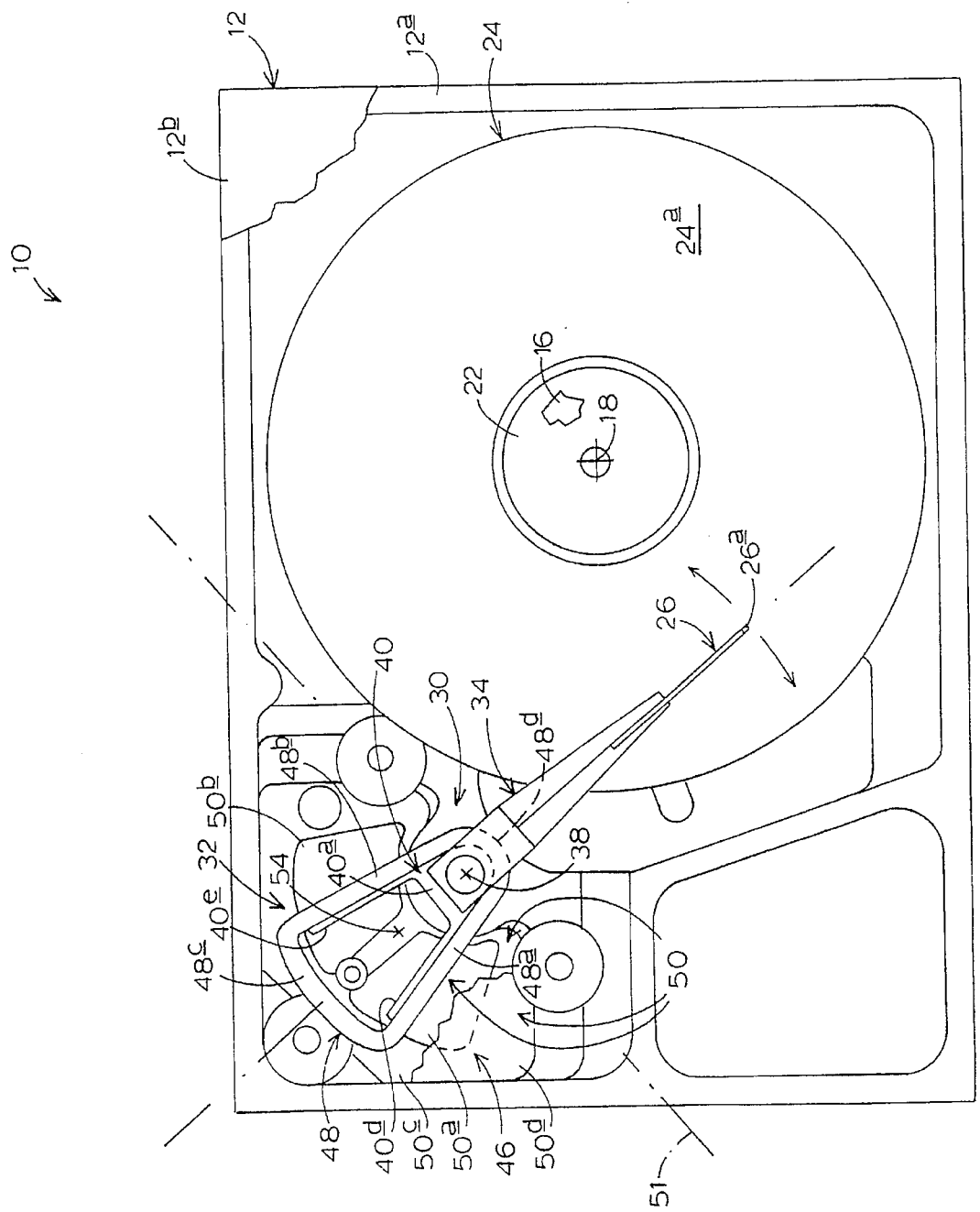
FIG. 1 is an opened-up, and partially fragmented, plan view illustrating a miniature-format, rigid-magnetic-disk information-storage system embodying a low-mass, low-torque-resistant, combined rotary actuator structure and read/write-transducer substructure assembly constructed in accordance with the special features of the present invention.
Figure 2:
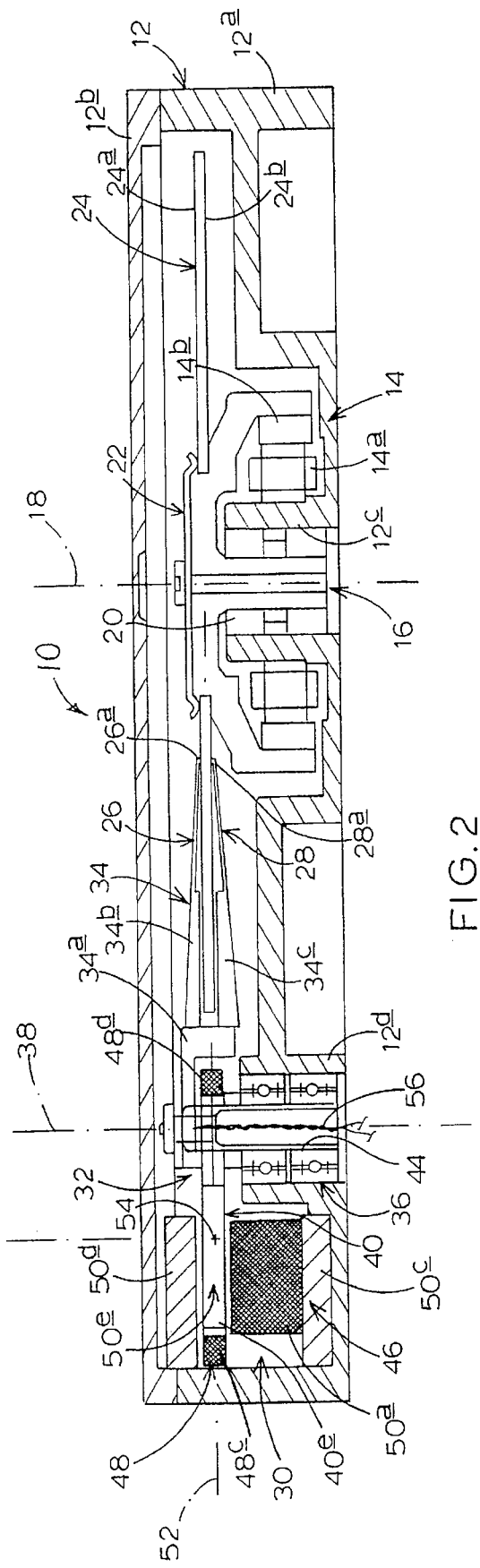
FIG. 2, which is on a slightly larger scale than FIG. 1, is a longitudinal section of the system shown in FIG. 1, taken as if viewed upwardly in FIG. 1.

Turning now to the drawings, and referring first to FIGS. 1 and 2, indicated generally at 10 is an information storage system in the form of a miniature, small-form-factor, rigid-disk drive system for storing digital information. Embodied in system 10 is a two-part housing 12 including a base 12a, and sealingly joined thereto in any suitable fashion, a cover 12b. The components that make up housing 12, which are also referred to herein as the main frame in the system, enclose all of the other components which, together with the housing, make up the entirety of system 10. In the preferred embodiment of the invention now being described, the inside of the sealed housing is maintained essentially at nominal atmospheric pressure.

System 10 has a dimensionality with a footprint having a length of approximately 73-millimeters (the left-to-right dimension in FIGS. 1 and 2), and a width of approximately 54-millimeters (the vertical dimension in FIG. 1). The dimensionality of system 10 also includes a height of approximately 13-millimeters (the vertical dimension seen in FIG. 2). Given these measurements, the dimensionality of system 10 occupies a volume of only about 50-centimeters$^3$. This system dimensionality corresponds specifically to a 48-millimeter media form factor (as is defined by the diameter of a single rigid disk, still to be mentioned, which is contained for operation within housing 12 in the system illustrated in FIGS. 1 and 2).

As has been suggested earlier herein, the present invention, while having special utility in the setting of a small-form-factor disk-drive system, can be used just as well, and to great advantage in larger-form-factor systems, and in systems which employ read/write heads, and suspensions therefor, which are different from the specific counterparts illustrated herein in system 10. For example, and with regard to the issue of heads and suspensions, the apparatus and method of the invention can be employed in systems employing low-mass flying heads.

Continuing with a description, disposed within the housing is a low-powered, brushless, DC spindle motor 14 (FIG. 2) which includes a coil-carrying stator 14a mounted suitably on the outside of a hollow, cylindrical supporting boss 12c (FIG. 2) formed in housing base 12a. Motor 14 also includes a permanent-magnet rotor 14h (also FIG. 2) which is suitably joined, with the disposition shown, to a lightweight rotary spindle 16. Spindle 16 is mounted through a journal bearing 20 (FIG. 2) which is seated within the hollow interior of boss 12c for rotation about an axis shown at 18. During drive operation, through appropriate connections (not illustrated) with conventional control/feedback electronics, motor 14 functions to maintain an accurate, constant spindle rotational speed of about 5400-rpm.

Supported on the upper side of spindle 16 (for rotation as a unit therewith) through a suitable clamp 22 is a rigid magnetic recording disk, or recording medium, 24 which is prepared on its opposite axial sides with magnetic layer structure for two-sided reading and writing of digitized information. These two sides of disk 24 are shown at 24a, 24h, and the magnetic recording layer structure (just mentioned) on each of the disk's sides is referred to as a recording surface. Disk 24 has an outer diameter herein of only 48-millimeters, and an overall thickness of only about 0.63-millimeters. It is the outer diameter of disk 24 which gives rise to the identification of system 10 as having a dimensionality corresponding to a 48-millimeter media form factor. The disk's small diameter contributes, inter alia, to low-mass, low-power-requirement spinning operation.

Further discussing disk 24, each recording surface takes the form an underlying magnetic flux-return layer with an in-plane magnetic anisotropy, and an outer, or overlying, hard magnetic recording layer with an out-of-plane magnetic anisotropy. The recording surfaces are each protected by a hard, smooth carbon overcoat, and by a lubricant layer, to minimize head and disk wear.

Cooperating with disk 24 in system 10, for reading and writing digital information with respect to recording surfaces 24a, 24b, are two, elongate, integrated, head/flexure/conductor structures 26, 28, respectively, which are constructed in accordance with features that are described in detail in the above-referred-to patent and co-pending patent applications. Each of structures 26, 28 includes a read/write head structure, or transducer (which will be pointed out shortly with reference to FIG. 4) carried adjacent the distal end of the structure, which end has a hardened contact pad (not specifically illustrated) that is substantially continuously in contact with the respective associated recording surface in disk 24. The distal ends of structures 26, 28 are shown at 26a, 28a, respectively. The ways in which structures 26, 28 are mounted according to the present invention for movement relative to the disk's recording surfaces will be explained shortly, but I will mention here that each of these elongate flexure structures is mounted with its cantilevered, free end at an angle of about 4-degrees with respect to the associated surface of disk 24, and with such free end contacting the associated disk surface (through the hardened contact pad mentioned above with a force also mentioned above) of about 40-milligrams.

Figure 4:
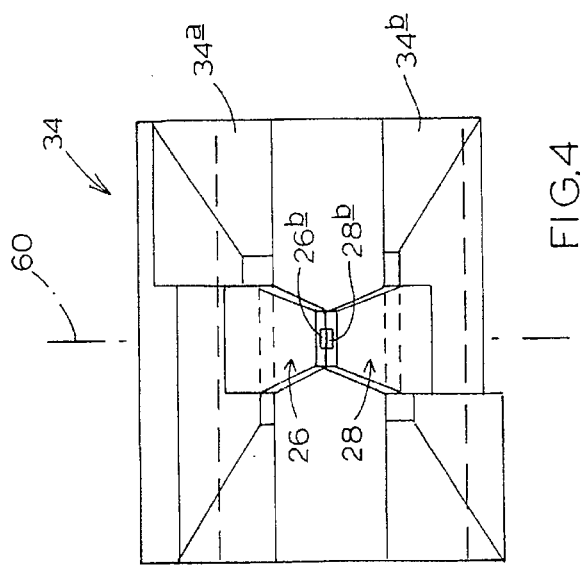
FIG. 4 is a still larger-scale view, taken generally along the line 4—4 in FIG. 3, to illustrate certain features of a read/write-transducer substructure which forms part of the assembly of FIGS. 1, 2 and 3.
Figure 3:
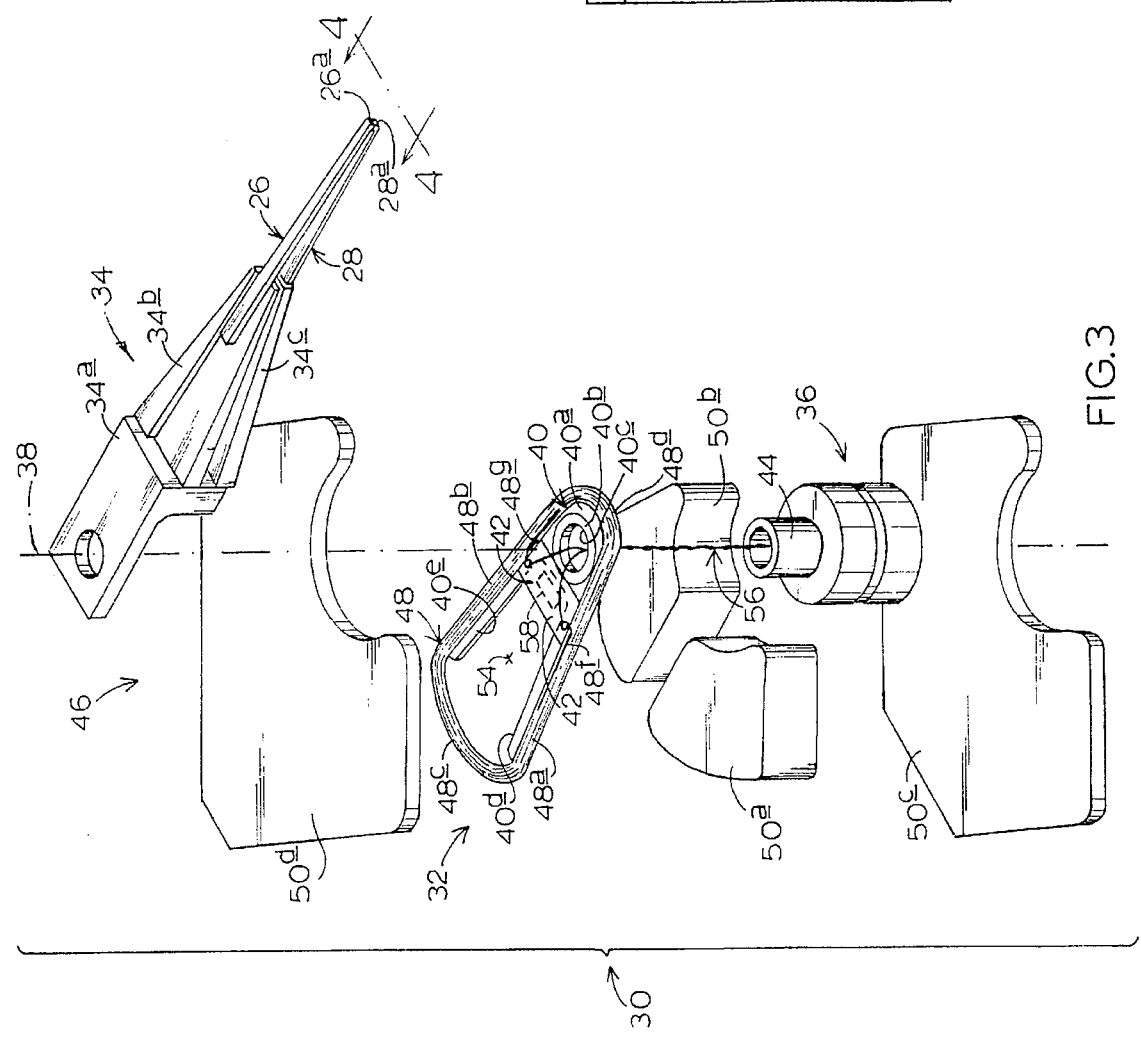
FIG. 3 is an enlarged view of components making up the combinational assembly of FIGS. 1 and 2, exploded and isolated from other structure to illustrate details of configuration and construction.

Looking now at FIGS. 3 and 4 along with FIGS. 1 and 2, included in system 10 in accordance with the features of the present invention is an assembly 30 including a rotary actuator structure 32 and a read/write-transducer substructure 34 which includes previously mentioned flexure structures 26, 28. For reasons which will become apparent, this assembly is referred to as a low-mass, low-torque-resistant assembly. Assembly 30 is journaled (as will be explained) on the inside of a hollow, cylindrical boss 12d (see FIG. 2) formed in housing base 12a through a journal bearing assembly 36 for reciprocal rotation about a journal axis shown at 38. While this journal mounting specifically exists directly on base 12a, it could, in a broader sense, also be effectively carried on the base (or other main frame component) through a suitable subframe, or other appropriate, intermediate substructure. Actuator structure 32 functions, and is thus referred to herein, as a carrier for the transducers which form part of structures 26, 28.

Actuator structure 32 includes a frame component 40 which has a main body portion 40a including a hub 40b which is hollow, as is indicated in FIG. 3, at 40c. Joined to the main body and hub portion of this frame component, and diverging generally radially with respect to the central axis of the hollow central portion of hub 40h, are two elongate legs 40d, 40e. Mounted on the frame component, in the region of joinder between the legs and the main body portion, is a lightweight, miniature circuit board 42 (seen only in FIG. 3) which accommodates certain connections which will be described with respect to circuitry in what is referred to herein as the "outside world".

Frame component 40 is fastened to the outside of an elongate, cylindrical, hollow pivot pin 44 which is suitably mounted within the inside of journal bearing assembly 36, generally as is shown in FIGS. 2 and 3. The actuator frame component is thus mounted on housing base 12a for turning on previously mentioned journal axis 38.

Also included in actuator structure 32 is an actuator motor, or motor means, 46 which includes, as its rotor (or first interactive reaction element), a winding 48, and as its stator, which is effectively mounted on housing 12, and which is also referred to as a second interactive reaction element, a structure 50 including a pair of oppositely magnetically oriented permanent magnets 50a, 50b, and lower and upper, magnetically permeable pole plates 50c, 50d, respectively, which are appropriately mounted within housing 12. Magnets 50a, 50h are oriented with their poles vertically displaced, as one views them generally in FIGS. 2 and 3. A space shown at 50e in FIG. 2 between the magnets and upper pole plate 50d is created by a suitable, rigid spacer (not shown), and functions as a flux gap in motor 46, which gap extends in a plane shown at 52 in FIG. 2. It is within this gap that previously mentioned winding 48, which has a somewhat rounded-corner, non-apexed, wedge-shaped configuration, is disposed for reversible rotary movement.

Further considering the construction of motor 46, the turns in winding 48 are supported and suitably mounted as shown on actuator frame component 40. These turns include legs 48a, 48h, which extend along the outside of previously mentioned legs 40d, 40e, respectively, a stretch 48c which extends between the distal ends of legs 40d, 40e, and a curvilinear run 48d which curls about body portion 40a as illustrated. Thus, and according to a significant feature of the present invention, the mass of winding 48 is distributed in such a fashion that portions are on opposite sides of a transverse plane 51 (see FIG. 1) which contains journal axis 38 and which is normal to the plane of FIG. 2 in the drawings. In the specific winding embodiment now being described, the turns in this winding circumscribe axis 38. Thus, and another way of looking at the mass-distribution situation now being described, a portion of the mass of winding 48 is on the transducer side of assembly 30. The center of mass of the winding is indicated generally at 54 in FIGS. 1, 2 and 3 on the opposite side of the assembly.

The opposite electrical ends of winding 48, shown at 48f and 48g in FIG. 3, are attached to suitable connector pads provided on circuit board 42 adjacent hub 40b. According to another important feature of the present invention, these ends communicate with outside circuitry through a slender, nearly zero-torque-generating stretch of conductors, or conductor means, shown at 56 in FIGS. 2 and 3 which extend generally on and substantially coincidentally along journal axis 38, through the hollow interiors of hub 40h and pivot pin 44. This slender conductor structure carries, in addition to the two conductors which are necessary for the energizing of winding 48, other conductors, not specifically illustrated, which connect through a junction region, shown generally in dashed lines at 58 in FIG. 3, with signal-carrying structure, such as conductors that extend toward the coils that are associated with the transducers in structures 26, 28. Winding 48 and this signal-carrying structure are referred to herein collectively as electrical current-utilizing structure.

If it is so desired, in order to prevent potential entry of contaminants through the hollow interiors of hub 40b and pivot pin 44, an end of this "axial" space may be sealed by a suitable material, such as an epoxy material.

Read/write transducer substructure 34 includes a mounting body 34a which is suitably joined to frame component 40 for rotation as a unit therewith, from which body project two elongate arms 34b, 34c which have the general configurations shown, which arms mount and support previously mentioned head/flexure/conductor structures 26, 28, respectively. The long axis of substructure 34 is disposed substantially within the plane of FIGS. 1 and 2, and normal to the plane of FIG. 4. Referring to FIG. 4 specifically, this axis can be thought of as extending also in a plane 60 which contains axis 38 and which forms a lateral, medial plane for substructure 34. Substructure 34 is symmetrically mass-balanced relative to plane 60.

The transducers (mentioned earlier) which are included within structures 26, 28 are shown at 26b, 28b, respectively, in FIG. 4.

Appropriately mounted on housing base 12a is an angular position limiter pin 62 (see FIG. 1) which limits the swing of all of the rotary structure, through engagement with the inner surfaces of the free ends of frame component legs 40d, 40e, to an arc of about 30-degrees. This allows transducers 26b, 28b to sweep into operative positions over the full recordable expanses of recording surfaces 24a, 24b. A further discussion of this sweep capability is found in above-referred to co-pending patent application Ser. No. 08/180,540.

Figure 5:
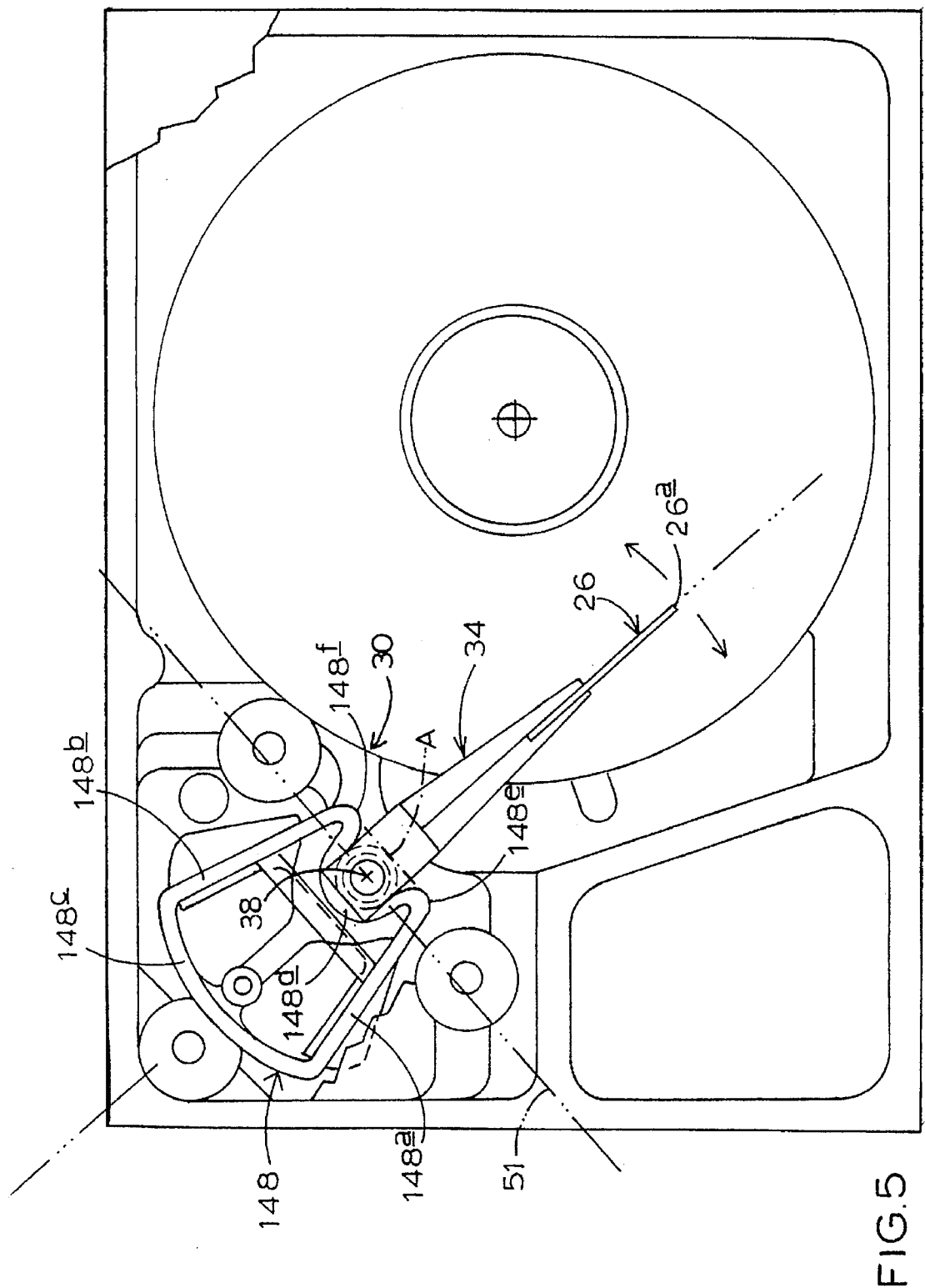
FIG. 5 (which is like FIG. 1) is an opened-up, and partially fragmented, plan view illustrating a miniature-format, rigid-magnetic-disk information-storage system embodying a low-mass, low-torque-resistant, combined rotary actuator structure and read/write-transducer substructure assembly constructed in accordance with the special features of an alternative embodiment of the present invention.

Shifting attention now to FIGS. 5 and 6, the reader will observe that a winding (first reaction element) 148 is configured in a manner somewhat different than winding 48 in FIGS. 1 and 3. It will be appreciated, however, that apart from the different winding configuration (and appropriately shaped supporting frame component), assembly 30 remains essentially the same as described hereinabove. Focusing specifically on winding 148, the reader will note that winding 148 includes two legs, or subelements, 148a, 148b which are generally straight and angularly offset relative to one another. First and second arcuate subelements 148c, 148d are joined by subelements 148a, 148b as shown, and are generally concave as viewed in a common direction from journal axis 38. As shown, subelement 148d is nearer journal axis 38 than subelement 148c, the former of which semi-circumbounds journal axis 38 such that the mass of winding 148 is distributed on opposite sides of plane 51 (FIG. 5). Hence, subelement 148d together with legs 148a, 148b form what may be viewed as a capital letter "W", and subelement 148c caps the "W".

Another way of looking at the mass-distribution situation described directly above is to recognize that elongate transducer substructure 34 extends along its own longitudinal axis toward a free end adjacent distal end 26a of structure 26, which longitudinal axis is disposed substantially normal to plane 51 (FIG. 5) containing journal axis 38. When winding, or first reaction element, 148 is viewed from the free end of substructure 34 along the longitudinal axis mentioned above, the winding may be seen to have a configuration which is concave for at least a portion which passes behind journal axis 38 and extends through plane 51 on either side of the aforementioned longitudinal axis so that the concave portion and a chord A (FIG. 5) thereon define a segment which bounds journal axis 38 as shown in FIG. 5. Put another way, subelement 148d which includes a pair of reverse bends 148e, 148f on opposite sides of journal axis 38, with a portion of each reverse bend crossing plane 51 as shown, semi-circumbounds journal axis 38 on a side of plane 51 which is opposite the free end of transducer substructure 34. Thus it is that winding 148 has a configuration which is symmetrical relative to a plane containing both the longitudinal axis of substructure 34 and journal axis 38.

As one very important consequence of the assembly structures which have just been described, the rotary mechanism portions of these structures, that is, all of that structure which rotates under the influence of motor 46 to adjust the positions of the transducers relative to the recording surfaces in disk 24, has an extremely low-mass and mass-balanced status, without the requirement that, in order to counterbalance the weight of the rotor coil in the motor, additional and unnecessary (otherwise nonoperative) mass be specially added to the transducer structure. This avoidance has been accomplished by forming the winding in the actuator motor (both embodiments) in such a fashion (such as the circumscribing or the semi-circumbounding fashions described so far) that it has mass distributed on what might be thought of as the transducer side of the journal axis relative to other portions of the rotor winding. That is to say, in both embodiments described above the winding has mass which is distributed in a dynamically imbalanced manner relative to the journal axis.

Cooperating with this significant mass-distribution advance, which is proposed by the present invention, to reduce the resistance to rotary motion offered by the rotor structure, is the fact that electrical conductors which must necessarily extend from the "outside world" of circuitry to the winding in the motor, and to the coils in the transducers, extend as a slender filamentary structure substantially on and coincidentally along the journal axis, thus making substantially inconsequential any torque resistance offered by this conductive connection during rotary operation. This novel approach is to be distinguished sharply from the lateral flex-circuit approach which has been employed by the most sophisticated prior art systems known to date.

Accordingly, there are rotor/transducer assembly structures proposed herein which offer ready achievement of all of the features and advantages mentioned earlier herein.

The novel mass distribution proposed according to this invention for the windings in coils 48 and 148 are preferably achieved by forming these windings in either a circumscribing or semi-circumbounding fashion, respectively, relative to journal axis 38.

Accordingly, while preferred and alternative embodiments of the invention have been discussed herein, it is appreciated that variations and modifications thereto may become apparent to those skilled in the art, and may be made without departing from the spirit of the invention.

It is claimed and desired to secure by Letters Patent:

1. A combined reciprocating-motion rotary actuator structure and read/write-transducer substructure assembly for the positioning of a transducer in the assembly relative to a recording surface in a rotating recording medium in a disk-drive system which includes a main frame, said assembly comprising an actuator frame component journaled effectively on the main frame in the system for rotation about a defined actuator journal axis, elongate transducer substructure having one end joined to said component for movement as a unit therewith, and extending from said one end along its own longitudinal axis toward a free end which includes a read/write transducer, said longitudinal axis being disposed substantially normal to a defined plane containing said journal axis, and an actuator motor drivingly interposed between said main frame and said component for producing reciprocal rotary motion thereof, and hence also of said transducer substructure, about said journal axis, said motor including first and second, relatively rotatable, interactive reaction elements, said first reaction element having a configuration which, when viewed from the free end of said substructure along said longitudinal axis, is concave for at least a portion thereof passing behind said journal axis and extending through said defined plane on either side of said longitudinal axis so that the concave portion and a chord thereon define a segment which bounds said journal axis.

2. A combined reciprocating-motion rotary actuator structure and read/write-transducer substructure assembly for the positioning of a transducer in the assembly relative to a recording surface in a rotating recording medium in a disk-drive system which includes a main frame, said assembly comprising an actuator frame component journaled effectively on the main frame in the system for rotation about a defined actuator journal axis, elongate transducer substructure having one end joined to said component for movement as a unit therewith, and extending from said one end along its own longitudinal axis toward a free end which includes a read/write transducer, said longitudinal axis being disposed substantially normal to a defined plane containing said journal axis, and an actuator motor drivingly interposed between said main frame and said component for producing reciprocal rotary motion thereof, and hence also of said transducer substructure, about said journal axis, said motor including first and second, relatively rotatable, interactive reaction elements, said first reaction element having a symmetrical configuration relative to a plane containing both said longitudinal axis and said journal axis, said configuration including a subelement semi-circumbounding said journal axis on a side of said first-mentioned plane opposite said free end, said subelement further including a pair of reverse bends on opposite sides of said journal axis, with a portion of each reverse bend crossing the first-mentioned plane.

3. A combined reciprocating-motion rotary actuator structure and read/write-transducer substructure assembly for the positioning of a transducer in the assembly relative to a recording surface in a rotating recording medium in a disk-drive system which includes a main frame, said assembly comprising an actuator frame component journaled effectively on the main frame in the system for rotation about a defined actuator journal axis, elongate transducer substructure having one end joined to said component for movement as a unit therewith, and extending from said one end along its own longitudinal axis toward a free end which includes a read/write transducer, said longitudinal axis being disposed substantially normal to a defined plane containing said journal axis, an actuator motor drivingly interposed between said main frame and said component for producing reciprocal rotary motion thereof, and hence also of said transducer substructure, about said journal axis, said motor including first and second, relatively rotatable, interactive reaction elements, said first reaction element having a configuration in which the mass of said element is distributed in a dynamically imbalanced manner relative to said journal axis, and is symmetrical relative to a single plane containing said journal axis and said longitudinal axis, and wherein said first reaction element semi-circumbounds said journal axis, and said configuration, when viewed from the free end of said substructure along said longitudinal axis, is concave for at least a portion thereof passing behind said journal axis and extending through said defined plane on either side of said longitudinal axis so that the concave portion and a chord thereon define a segment which bounds said journal axis.

\* \* \* \* \*